(12) United States Patent
Setescak

(10) Patent No.: US 7,516,761 B2
(45) Date of Patent: Apr. 14, 2009

(54) FLOW RECTIFIER FOR AN AIR MASS SENSOR

(75) Inventor: Stephen Setescak, Pentling (DE)

(73) Assignee: Siemens Aktiengesellschaft, Munich (DE)

( * ) Notice: Subject to any disclaimer, the term of this patent is extended or adjusted under 35 U.S.C. 154(b) by 25 days.

(21) Appl. No.: 10/504,174

(22) PCT Filed: Feb. 6, 2003

(86) PCT No.: PCT/DE03/00343

§ 371 (c)(1),
(2), (4) Date: Aug. 11, 2004

(87) PCT Pub. No.: WO03/069284

PCT Pub. Date: Aug. 21, 2003

(65) Prior Publication Data

US 2005/0087012 A1 Apr. 28, 2005

(30) Foreign Application Priority Data

Dec. 12, 2002 (DE) .................. 102 05 757

(51) Int. Cl.
*F15D 1/02* (2006.01)
(52) U.S. Cl. .............. 138/39; 138/41; 138/44
(58) Field of Classification Search ........... 138/41, 138/44, 39
See application file for complete search history.

(56) References Cited

U.S. PATENT DOCUMENTS

| | | | | | |
|---|---|---|---|---|---|
| 1,545,209 | A | * | 7/1925 | Steckel | 137/220 |
| 3,310,287 | A | * | 3/1967 | Clark et al. | 415/209.2 |
| 3,405,737 | A | * | 10/1968 | Harper | 138/39 |
| 3,572,391 | A | * | 3/1971 | Hirsch | 138/40 |
| 3,645,298 | A | * | 2/1972 | Roberts et al. | 138/40 |
| 3,996,025 | A | * | 12/1976 | Gulden | 48/107 |
| 4,202,375 | A | * | 5/1980 | Hoerauf et al. | 138/39 |
| 4,280,360 | A | * | 7/1981 | Kobayashi et al. | 73/198 |
| 4,467,829 | A | * | 8/1984 | Myers | 137/561 A |
| 4,665,950 | A | * | 5/1987 | Fruh | 138/44 |
| 5,009,839 | A | * | 4/1991 | King | 376/352 |
| 5,456,288 | A | * | 10/1995 | Jacobs | 138/44 |
| 5,482,249 | A | * | 1/1996 | Schafbuch et al. | 251/118 |

(Continued)

FOREIGN PATENT DOCUMENTS

DE    196 47 081    5/1998

(Continued)

OTHER PUBLICATIONS

Examination Report from the German Patent and Trademark Office dated Nov. 10, 2003.

(Continued)

*Primary Examiner*—James F Hook
(74) *Attorney, Agent, or Firm*—Laurence A. Greenberg; Werner H. Stemer; Ralph E. Locher

(57) ABSTRACT

The invention relates to a mass tube (1) for an air measuring sensor (3) comprising a metal grid (4) acting as a flow rectifier arranged perpendicular to the air flow (2). At least two fixing elements (5) are arranged on the measuring tube (1), said elements extending inwards in a radial manner, whereon the metal grid (4) is fixed by pre-tensioning.

8 Claims, 2 Drawing Sheets

U.S. PATENT DOCUMENTS

| | | | | |
|---|---|---|---|---|
| 5,529,092 A | * | 6/1996 | Arnoldt | 138/39 |
| 5,750,892 A | * | 5/1998 | Huang et al. | 73/202 |
| 5,927,339 A | * | 7/1999 | Ellis et al. | 138/39 |
| 6,119,730 A | * | 9/2000 | McMillan | 138/43 |
| 6,142,014 A | | 11/2000 | Rilling | |
| 2005/0039809 A1 | * | 2/2005 | Speldrich | 138/39 |

FOREIGN PATENT DOCUMENTS

| | | |
|---|---|---|
| DE | 196 47 086 | 5/1998 |
| DE | 198 27 375 | 12/1999 |
| EP | 0 458 998 | 12/1991 |
| JP | 62141125 A | 6/1987 |
| JP | 2000503408 A | 3/2000 |

OTHER PUBLICATIONS

International Search Report from the European Patent Office dated Jun. 18, 2003, PCT/DE03/00393.

Japanese Office Action dated Aug. 20, 2008.

* cited by examiner

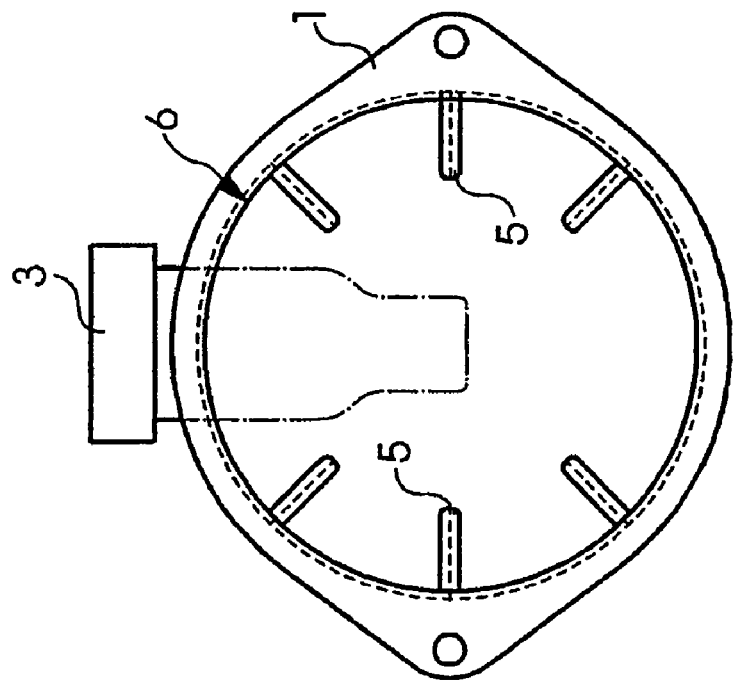
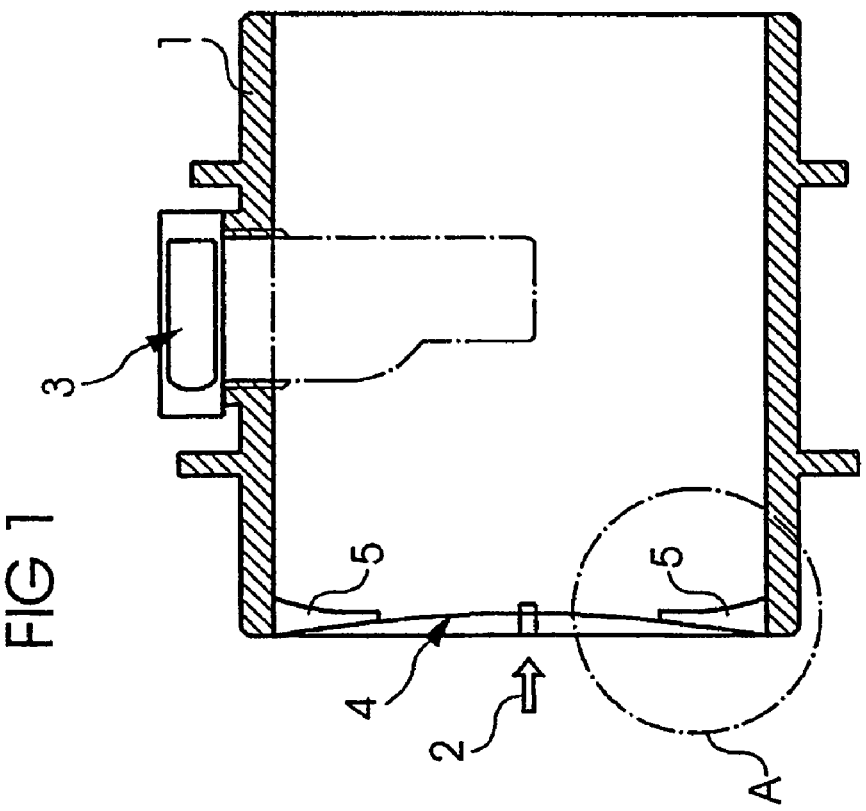

FLOW RECTIFIER FOR AN AIR MASS SENSOR

CLAIM FOR PRIORITY

This application is a national stage of International Application No. PCT/DE03/00343 which was published on Aug. 21, 2003, and which claims the benefit of priority to German Application No. 102 05 757.5 filed Feb. 12, 2002.

TECHNICAL FIELD OF THE INVENTION

The invention relates to a measuring tube for an air mass sensor and method for producing same, and in particular, to a measuring tube for an air mass sensor with a metal grid arranged therein transversely to the air flow and functioning as a flow straightener and method for producing same.

BACKGROUND OF THE INVENTION

A conventional measuring tube is known from EP 0 458 998 B1 for use in a motor vehicle. The flow straightener consists of a honeycomb grid made from plastic, with a metal grid welded to its edge. The flow straightener is fastened to the measuring tube inlet, for example, by means of hot caulking.

In the known flow straightener, vibrations occurring in the vehicle may result in a mechanical failure of the metal grid. Moreover, it is possible that, on account of ageing, the influence of temperature, moisture absorption and/or a change in the measuring tube geometry, the metal grid buckles in an undefined manner, which may lead to a swirling of the air flow.

SUMMARY OF THE INVENTION

According to one embodiment of the invention, the measuring tube has arranged on it at least two fastening elements which extend radially inward and to which the metal grid is fastened under prestress. In the method according to the invention, the prestress is generated such that the fastening elements are bent by means of a suitable tool. Thereafter, the metal grid is fastened to the fastening elements, and the tool is subsequently removed again.

So as not to influence the air flow needlessly, in an advantageous embodiment of the invention, the fastening elements are designed as narrow rib-like structures. In this case, two fastening elements are basically sufficient. However, better fastening is obtained with a greater number of fastening elements which are preferably arranged equidistantly on the inner wall of the measuring tube, for example are integrally formed in one piece on the measuring tube.

In a further embodiment of the invention, the ends of two fastening elements in each case are connected to one another by means of a connecting element in such a way as to produce a stirrup-shaped fastening structure or stirrup-shaped fastening structures. The connecting elements may in this case be bent concentrically to the measuring tube.

In one advantageous embodiment, before the fastening of the metal grid, the fastening elements are curved in or opposite to the air flow direction. As a result, by means of the tool, they can be brought into a straight state, that is to say bent opposite to their direction of curvature. In this straight state, it is simpler to handle the fastening of the metal grid.

BRIEF DESCRIPTION OF THE DRAWINGS

The invention is explained in more detail below by means of exemplary embodiments, with the aid of figures in which:

FIG. 1 shows a first exemplary embodiment of a measuring tube according to the invention.

FIG. 2 shows a front view of the measuring tube according to FIG. 1.

DETAILED DESCRIPTION OF THE INVENTION

Figure 3:
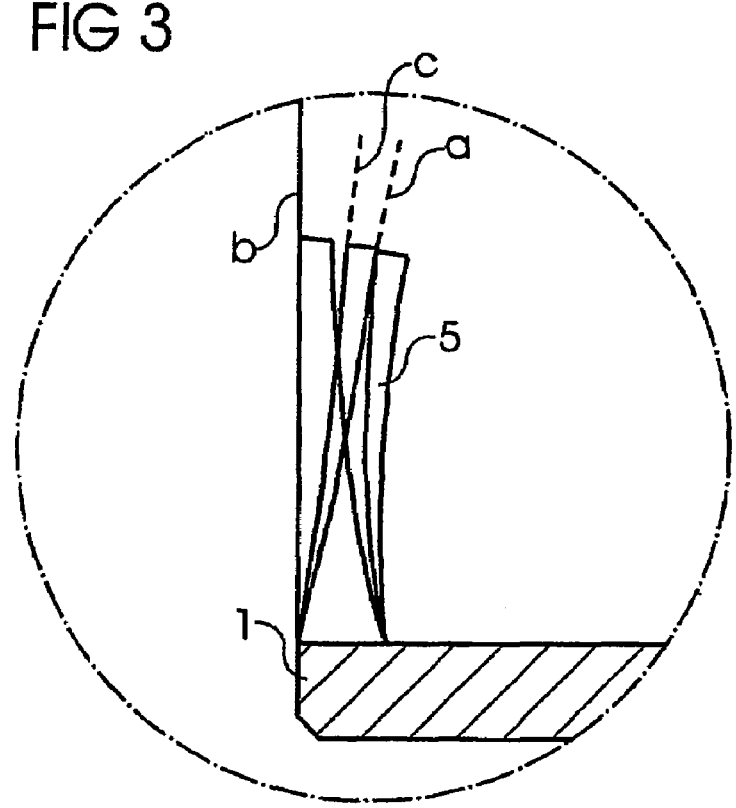
FIG. 3 shows an illustration of a detail of the measuring tube according to FIG. 1.

FIG. 1 shows a measuring tube 1 for a mass air flow which is indicated by an arrow 2. An air mass sensor arrangement 3, not explained in any more detail, is plugged into the measuring tube. A metal grid 4 functioning as a flow straightener is arranged, transversely to the flow direction 2, upstream of the air mass sensor arrangement 3 with respect to the mass air flow 2. Said metal grid is connected to the measuring tube 1 under prestress by means of fastening elements 5 in the way according to the invention.

FIG. 2 shows that, in the exemplary embodiment illustrated, 6 narrow rib-shaped fastening elements 5 are arranged on the inner wall of the measuring tube 1, preferably are integrally formed in one piece on the inner wall. In this case, they run radially into the interior of the measuring tube 1. Their length is dimensioned such that they allow a reliable and resistant fastening of the metal grid 4, but do not appreciably influence the flow profile. The region of connection of the metal grid to the fastening elements 5 is indicated by a broken line 6.

The operation of producing the measuring tube 1 is explained in more detail by means of the illustration of the detail A in FIG. 3. Three positions or states of a fastening element 5 are designated there by the letters a, b and c.

The state a designates the production-related state of the fastening element 5, in that the latter is curved in the flow direction 2. The fastening element 5 is brought by means of a tool, not illustrated in any more detail, into the state b, in which it is virtually perpendicular to the measuring tube 1, that is to say virtually straight. In this state b, the metal grid 4 is connected, for example welded by ultrasonic welding, to the fastening element 5. Thereafter, the tool is removed, whereupon the fastening element 5 seeks to return to its initial state a again, but is prevented from doing so by the metal grid 4, so that the fastening element can bend back into the state b in which it holds the metal grid 4 under prestress. What is achieved thereby, on the one hand, is that the metal grid 4 cannot buckle in an undefined manner, and, moreover, it can be excited to vibrations only at markedly higher frequencies, so that it has higher vibration resistance.

Figure 4:
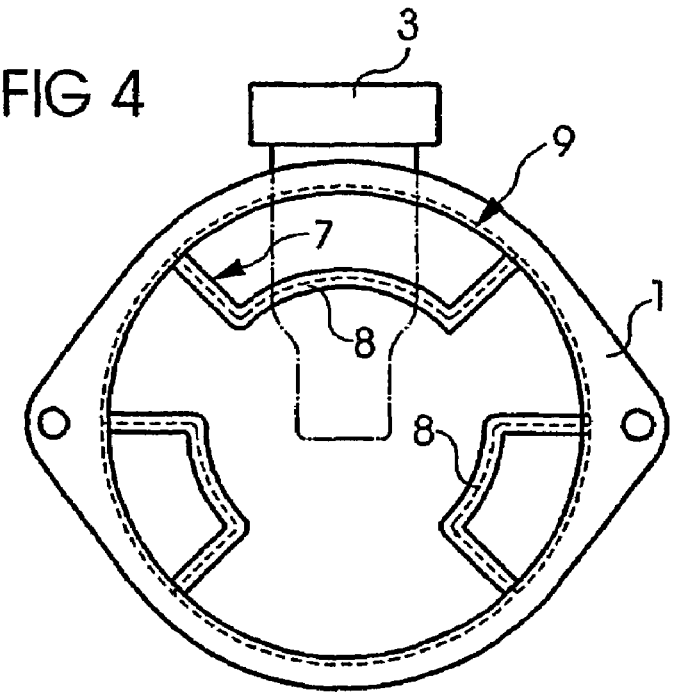
FIG. 4 shows a front view of a second exemplary embodiment of a measuring tube according to the invention.

A development of the measuring tube 1 according to the invention can be seen in a front view in FIG. 4. There, in each case two of the fastening elements 7 are connected by means of connecting element 8 bent concentrically to the inner wall of the measuring tube 1, so as to produce stirrup-shaped fastening structures for the metal grid 4. The fastening surface for the metal grid 4 is illustrated by a broken line 9. By means of the connecting elements 8, which are preferably formed in one piece with the fastening element 7, a better fastening of the metal grid 4 in the inner region of the measuring tube 1 is possible.

What is claimed is:

1. A measuring tube configuration for an air mass sensor, comprising:

a measuring tube;

a metal grid configured in said measuring tube transversely to an air flow through said measuring tube, said metal grid functioning as a flow straightener; and at least two fastening elements extending radially inward in said measuring tube, said fastening elements having at least a first initial position and a second stressed position under radial tension;

said metal grid being fastened under prestress to said fastening elements in the second position such that said fastening elements seek to return from the second stressed position to the first initial position; and said fastening elements applying a biasing force to said metal grid in a direction of the air flow or in a direction opposite the air flow.

2. The measuring tube configuration as claimed in claim 1, wherein said fastening elements are narrow rib-like structures.

3. The measuring tube configuration as claimed in claim 2, wherein said two fastening elements each include a connecting element and ends that are connected to one another by said connecting element in a configuration having a stirrup-shaped fastening structure.

4. The measuring tube configuration as claimed in claim 1, wherein before fastening the metal grid to the fastening element in the second position, in the initial position the fastening elements are curved in or opposite to the air flow direction.

5. The measuring tube configuration as claimed in claim 1, wherein said fastening elements are directly fixed to said metal grid.

6. A method for producing a measuring tube for an air mass sensor, comprising the steps of:

arranging a metal grid in the measuring tube transversely to an air flow, wherein the metal grid functions as a flow straightener, and wherein the measuring tube has arranged on it at least two fastening elements which extend radially inward and which have an initial position and a second stressed position under radial tension, using a tool to locate and prestress the fastening elements in the second stressed position in which the fastening elements are bent in or opposite to the air flow direction, fastening the metal grid to the fastening elements while the fastening elements are in the second position, and removing the tool after the metal grid is fastened to the fastening elements in the second position, the fastening elements seeking to return from the second stressed position to the initial position, the fastening elements applying a biasing force to the metal grid opposite to a direction in which the fastening elements were bent by the tool.

7. The method as claimed in claim 6, wherein the fastening elements are bent opposite to their direction of curvature by a tool.

8. The method as claimed in claim 6, wherein the metal grid is fastened directly to the fastening elements.

* * * * *